United States Patent Office 3,711,376
Patented Jan. 16, 1973

3,711,376
COAGULANTS
Mark W. C. Hatton, London, England, assignor to Twyford Laboratories Limited, Alperton, Wembley, Middlesex, England
No Drawing. Filed June 29, 1970, Ser. No. 50,938
Claims priority, application Great Britain, July 4, 1969, 33,780/69
Int. Cl. C07g 7/026
U.S. Cl. 195—62             11 Claims

ABSTRACT OF THE DISCLOSURE

An improvement in the process for purifying the anticoagulant enzyme from the venom of *Ancistrodon rhodostoma* (the Malayan pit viper) comprises including, among the separation steps already known, that of separation on a weakly acid cation exchange material. The invention also includes a novel caseinolytic enzyme found in the venom and which may be separated by these procedures.

---

This invention relates to anticoagulant materials and is especially concerned with the recovery of the defibrinating enzyme present in the venom of *Ancistrodon rhodostoma* (the Malayan pit viper). The preparation and characterisation of this enzyme are described in U.K. patent specification No. 1,094,301.

The clotting of human and other mammalian blood proceeds by a complicated mechanism which occurs in distinct stages. In the last stage of the process blood fibrinogen is converted by means of the enzyme thrombin into "fribin monomer" which then undergoes polymerization to produce fibrin, the material of the clot.

The U.K. patent specification above referred to describes the discovery that there exists in the venom of *Ancistrodon rhodostoma* an enzyme which has a thrombin-like action but which modifies blood fibrinogen in such a way that the fibrin produced from it has different properties from those of the normal thrombin-formed clot. Fibrin induced by this enzyme is of a whispy character and as a result of the continual flow of blood in vivo it is insensibly dispersed in the blood passages so that clots are not formed. That specification also describes how the venom may be purified by removal of proteolytic constituents which cause reverse local reaction and other undesirable side effects to produce a purified fraction of the venom in which the properties of the defibrinating anticoagulant enzyme may be utilized in therapy as well as for research purposes.

The purification procedure described in U.K. specification No. 1,094,301 for recovering the enzyme from the venom involves the use of weakly basic anion exchange material as an adsorbent for the active principle. Suitable exchange materials are those containing tertiary amino groups attached, for example, to a carbohydrate polymer and amongst this class of adsorbents triethylaminoethyl cellulose (TEAE) has so far proved to be the preferred material.

In British patent specification No. 1,177,506 further purification can be achieved by the additional step of gel filtration.

It has now been discovered that the active defibrinating material recovered by means of anion exchange materials is capable of resolution into components having different types of activity. This may be regarded as a further purification of the active principle which is predominant in the product recovered from anion exchange material. Thus, the primary component is an enzyme fraction which is thrombin-like in respect of the property to degrade the α-chain of fibrinogen. This is the defibrinating enzyme referred to above, and evidence is available to show that this component has a highly specific proteolytic activity for the 16–17 (arginyl-glycyl) bond of the α-chain of human fibrinogen. The secondary component, which constitutes up to about 20% of the material on a protein basis, lacks this property but has caseinolytic properties and appears to be capable of degrading fibrinopeptides A and AP resulting from the action of the primary component, and evidence is available to show that this secondary component splits these isolated peptides at the 7–8 (asparaginyl-phenylalanyl) bond to release two smaller peptides. Owing to its highly selective properties it is a valuable biochemical reagent for investigational purposes in the field of peptide chemistry.

The present invention therefore comprises a defibrinating enzyme fraction of *Ancistrodon rhodostoma* venom which degrades the α-chain of fibrinogen, said enzyme fraction being substantially free from non-fibrinogen-degrading components of the venom.

The invention also comprises a fibrinogen-fragment-degrading enzyme fraction of *Ancistrodon rhodostoma* venom substantially free from any enzyme component of the venom which degrades the α-chain of fibrinogen.

These enzyme fractions are separated from one another in accordance with this invention by subjecting *A. rhodostoma* venom or fractions thereof containing the desired enzymes to fractionation on cation exchange material.

The cation exchange materials employed are those which are recommended for use with sensitive materials such as proteins and polypeptides, these being usually of a weakly acid character to avoid denaturation or hydrolysis of peptide linkages. Suitable weakly acidic cation exchange materials are certain polymeric materials containing carboxyl or phosphate groups, and in practice polyacrylic and polymethacrylic resins are convenient for the purpose of this invention. Amberlite IRC-50 (trademark), supplied by Rohm & Haas, being especially preferred. As other useful cation exchange materials may be mentioned phenolformaldehyde polymer resins with functional —COO⁻ groups for example Zeocarb 216 (trademark) supplied by Permutit Ltd.; celluloses with functional —COO⁻ groups for example a carboxymethyl-cellulose CM14 supplied by Whatman Ltd.; and celluloses with functional —PO₃H groups e.g. the grade P11 supplied by Whatman Ltd.

The use of cation exchange material, according to the present invention, preferably forms one step in a purification process based primarily on the use of anion exchange material to separate the desired enzyme constituents of the venom from the harmful or unwanted materials therein, including the haemorrhagic factor and the enzymes which cause tissue and vascular necrosis. Fractionation of the venom or venom extracts or concentrates on anion exchange material and cation exchange material may be carried out in any desired order, but preferably the material is fractionated first on anion exchange material and then on cation exchange material. Thus, the eluate which is obtained from the purification on weakly basic anion exchange material, and which contains the defibrinating enzyme, can be applied directly onto the weakly acidic cation exchange material, without any concentration or other alteration. Proceeding in this way has the additional advantage that the flow-rate of the elution of the weakly acidic cation exchange material can be moderately fast.

The adsorption of the enzymes on cation exchange materials may be made from a variety of suitable buffer solutions. Trisphosphate buffer, which is commonly used also for the adsorption on anion exchange materials, has proved to be particularly suitable. Elution of the desired materials may be made by means of tris buffer or any other suitable buffer, including, for example, sodium phosphate buffer pH 6.5, e.g. 0.06 molar–0.3 molar and a particularly effective way of separating the primary and secondary components is to elute with buffer of increasing pH and molarity. For example, unwanted materials may be eluted at pH 6.0–6.5 e.g. 6.4 with buffer of molarity of 0.02–0.10 following which the primary component, i.e. purified defibrinating enzyme may then be removed with buffer of pH from 6 to 10 preferably about 8 and molarity of 0.02 and higher, e.g. about 0.1. The buffer which is employed to elute the desired fraction preferably contains a physiologically acceptable salt such as sodium chloride, e.g. of molarity 0.35.

It will be appreciated that additional purification steps may be employed with the process of this invention. Thus in order to surmount the disadvantages which are sometimes encountered with commercially available triethylaminoethyl cellulose, the additional step of gel filtration may be adopted employing, for example, suitable cross-linked dextrans, polyacrylamide and galactose polymers as described in U.K. patent specification No. 1,177,506. The order in which the anion exchange, cation exchange, and gel filtration steps are employed is not unduly critical, but gel filtration is preferably carried out after the anion exchange and before the cation exchange steps. For example if that fraction from purification of whole venom on TEAE cellulose, as described in British patent specification No. 1,094,301, referred to as fraction 6 or below as fraction VI, is then further fractionated under appropriate conditions, on IRC–50, two fractions are produced:

(1) A first eluted fraction containing all the caseinolytic enzyme and all the haemorrhagic factor and
(2) A second eluted fraction which contains only the defibrinating enzyme in a very pure state and in good yield.

The invention is illustrated in the following examples, the procedures of which are carried out at room temperature.

EXAMPLE 1

TEAE cellulose fractionation of crude venom

The fractionation is carried out by the method of U.K. specification No. 1,094,301 modified as described in the example of U.K. patent specification No. 1,177,506. Protein eluted is followed by U.V. absorption on a continuous Uvicord recorder at $254\mu$, and by subsequent fraction measurements at $280\mu$.

2 g. of the crude venom are dissolved in 70 ml. of 0.01 M trisphosphate, pH 8.5, and the insoluble white sediment is spun off. The clear yellow supernatant is loaded on to the TEAE cellulose column, 35 cm. x 3.9 cm. The ion exchanger nominal capacity 0.65 m. equiv. per g., is treated and the column packed according to the previously used procedure. After loading, the column is eluted with the same solvent, viz. 0.01 M trisphosphate pH 8.5.

The complete pattern of elution, carried out at room temperature over 2 days at 250 ml. per hour, is as follows. The approximate volume of the eluant used is given, but the actual changeover of eluant is determined by the U.V. absorption reading.

| Eluant: | | |
|---|---|---|
| 1 | .01 M tris-phosphate, pH 8.5_ 750 ml. | Fraction I, II and III. |
| 2 | .01 M tris-phosphate, pH 7__ 2,000 ml. | Fraction IV. |
| 3 | .02 M tris-phosphate, pH 6__ 3,000 ml. | Fraction V. |
| 4 | .06 M tris-phosphate, pH 6__ 1,500 ml. | Fraction VI. |
| 5 | .1 M NaCl, .09 M tris-phosphate, pH 6. 500 ml. | Fraction VII. |
| 6 | 2 M NaCl, .09 M tris-phosphate, pH 6. 1,000 ml. | Fraction VIII. |

TLA (thrombin-like activity) measured as described in U.K. specification No. 1,094,301 is gradually increasing in these fractions. Fraction VI is eluted as a peak with a steep initial protein and TLA rise followed by a gradual fall.

Fractionation of Fraction VI on Amberlite IRC–50

500 ml. of a bulked Fraction VI preparation of activity 75 thrombin units per ml. and $$D^{1\,cm.}_{280\,nm.}$$

(optical density in a 1 cm. path-length silica cell measured at 280 nm.) 0.159, are passed through a column of Amberlite IRC–50, 8.5 cm. x 2.2 cm., previously equilibrated with 0.04 M tris-phosphate buffer of pH 6.2 and conductivity $0.12\times10^4$ $\mu$mho at 21° C., at a flow rate of 55–60 ml. per hour. Washing is continued with 0.04 M tris-phosphate buffer pH 6.2 until the $$D^{1\,cm.}_{280\,nm.}$$

value falls below 0.02; about 80 ml. of buffer are required. The eluate is assayed for protein content by U–V absorption at 280 nm., and for TLA and it is found that 60% of the protein and 1% of the TLA are eluted.

The column is now eluted at a flow rate of 50 ml. per hour with 100 ml. of 0.10 M tris-phosphate buffer at pH 8.3 containing 2% NaCl (i.e. 0.33 M with respect to NaCl), and the eluate is again assayed for protein content and TLA. It is found that 31% of the protein and 85% of the TLA are recovered in this fraction (the overall recovery of activity from crude venom is therefore 50–55%); the bulked fraction has a $$D^{1\,cm.}_{280\,nm.}$$

of 0.168 and a TLA value of 250 units per ml. Its specific activity is therefore approximately 1500. To prepare a pharmaceutical preparation from this fraction, the eluate having a TLA value of 250 units is diluted in normal physiological saline to an activity of about 70 thrombin units per ml. and sterilised by membrane filtration (Millipore-Type HA). The sterile solution is dispensed aseptically into 1.1 ml. volumes in standard 1 ml. all-glass ampoules and sealed. This gives convenient single dose quantities for intravenous or intramuscular injection.

EXAMPLE 2

Fraction VI prepared as described in Example 1, is fractionated according to the following conditions:

System 0.04 M tris-phosphate buffer pH 6.4
Column 10 x 2 cm. Amberlite IRC–50
Eluant 0.04 M tris-phosphate buffer pH 6.4. Conductivity (20° C.) $0.10\times10^4$ $\mu$mho
Effluent pH 6.4, conductivity as above.
Load 500 ml. of fraction VI.

This sample is not concentrated or desalted. It is allowed to run through the resin under the conditions stated which are the same pH and conductivity as the sample itself.

| Elution | Mls./hr. |
|---|---|
| (a) 0.04 M tris-P pH 6.4 | 100 |
| (b) 0.1 M tris-Cl pH 8.5 (2% NaCl) | 30 |

Two protein peaks are eluted.

In Peak 1, high haemorrhagic factor activity and caseinolytic activity are found with very small or no coagulant activity.

In Peak 2, caseinolytic and haemorrhagic factor activity are zero or negligible but coagulant activity is very great and generally equal to the total amount loaded. (Recoveries approach 90% or sometimes more.)

The presence of the three biological activities of Peak VI, i.e. coagulant, caseinolytic and haemorrhagic factor can be visually assessed by electrophoresis on polyacrylamide gels. (Three zones can be easily identified by electrophoresing Peak VI.) Similarly, the electrophoretic cation exchangers can be related to their various biological properties. In this way also Peak 2 can be shown to be freee from caseinolytic and haemorrhagic factor activity and yet contain only coagulant activity.

EXAMPLE 3

Fraction VI, prepared as described in Example 1 is fractionated according to the following conditions:

System 0.1 M phosphate buffer pH 6.0
Column 10 x 2 cm. Amberlite IRC–50
Eluant 0.1 M phosphate buffer pH 6.0. Conductivity (20° C.) $0.05 \times 10^4$ μmho
Effluent pH 6.0, conductivity as above.

Load is 500 mls. of fraction VI from TEAE-cellulose desalted on Sephadex G25 into 0.1 M phosphate buffer pH 6.0.

Two protein peaks are recovered and they resemble closely the two peaks described in the previous example with regard to their biological activities and electrophoretic patterns. Recovery of coagulant activity is again about 90%.

Summary of the conditions necessary for resins/celluloses for extraction of coagulant enzyme from Peak VI (TEAE-cellulose).

| Resin | Equilibrated P pH 6.0 | Hf | Peak 2 Cas | Coag. |
|---|---|---|---|---|
| CMC(CM14) | 0.001 M | | | +++ |
| PC(P.11) | 0.1 M | | | +++ |
| Zeocarb. 216 | 0.01 M | | | +++ |
| IRC–50 | 0.1 M | | | +++ |
| cf. Sephadex G100 | | | | +++ |

It is possible also to isolate the coagulant enzyme from the whole venom using Amberlite IRC–50 as a first step and either TEAE-cellulose or Sephadex G100 as a second step. In this case, the conditions in the second example for Amberlite IRC–50 are used to fractionate the venom and the coagulant peak obtained after concentration and desalting (dialysis) is then refractionated on TEAE-cellulose and Sephadex G100 by the Esnouf and Tunnah method, or just by Sephadex G100 gel filtration. In either case a coagulant product free from haemorrhagic factor and caseinolytic activity is obtained.

EXAMPLE 4

100 mls. of peak 1 is concentrated down to 5 mls. by rotary evaporation. This is loaded on to a Sephadex G100 column of dimensions 70 x 2.5 cms. and eluted with an aqueous buffer in the pH range 6.5 to 9.0. The buffer of choice is 0.5 M tris-Cl pH 8.5 which allows the eluted caseinolytic enzyme to be buffered at the pH where it shows maximum activity. The elution is carried out at 15 mls./hr. at room temperature.

Three peaks emerge, as measured at 280 mμ on the spectrophotometer. Most of the caseinolytic activity is found in the second peak and haemorrhagic factor activity and clotting activity are either very small or absent. Haemorrhagic factor and some caseinolytic activity are found in the third peak. These biological properties are confirmed by analysing these two peaks electrophoretically on polyacylamide gels.

I claim:

1. In a process for the recovery of the thrombin-like difibrinating enzyme material present in *Ancistrodon rhodostoma* venom by adsorption on and recovery from weakly basic anion exchange material so as to separate the enzyme from unwanted venom constituents, the improvement which comprises subjecting the venom to be purified to fractionation on a weakly acidic cation exchange material, the anticoagulant enzyme material so recovered being characterized in that it degrades the alpha chain of fibrinogen and is substantially free from components having caseinolytic and haemorrhagic activity and proteolytic enzymes causing tissue and vascular necrosis.

2. A process as claimed in claim 1 in which the cation exchange material is a polymeric material containing carboxyl or phosphate groups.

3. A process as claimed 2, in which the polymeric material is polyacrylic resin.

4. A process as claimed in claim 2 in which the material is a phenol-formaldehyde polymer resin with functional —COO⁻ groups.

5. A process claimed in claim 2, in which the material is a carboxymethylcellulose.

6. A process as claimed in claim 2 in which the material is a cellulose with functional —PO₃H groups.

7. A process as claimed in claim 1 in which the fractionation on a weakly acidic cation exchange material is carried out after the recovery of the material from the anion exchange material.

8. A process for the preparation of an anticoagulant enzyme material having thrombin-like defibrinating activity, which comprises: (a) adsorbing *Ancistrodon rhodostoma* venom on weakly basic anion exchange material and recovering a defibrinating fraction which is substantially free from proteolytic enzymes causing tissue and vascular necrosis; and (b) adsorbing the said fraction on weakly acidic cation exchange material and recovering a defibrinating fraction which degrades the alpha-chain of fibrinogen and which is substantially free from components having caseinolytic and haemolytic activity.

9. A process for the preparation of an anticoagulant enzyme material having thrombin-like defibrinating activity, which comprises: (a) adsorbing *Ancistrodon rhodostoma* venom on weakly acidic cation exchange material and recovering a defibrinating fraction which degrades the alpha-chain of fibrinogen and which is substantially free from components having caseinolytic and haemolytic activity; and (b) adsorbing said fraction on weakly basic anion exchange material and recovering a defibrinating fraction which is substantially free from proteolytic enzymes causing tissue and vascular necrosis.

10. A process as claimed in claim 1 in which the fractionation on a weakly acidic cation exchange material is carried out before recovery of the material from the anionic exchange material.

11. The thrombin-like defibrinating enzyme material prepared by the process of claim 1.

References Cited

FOREIGN PATENTS 1,177,506   1/1970   Great Britain.
1,094,301   12/1967   Great Britain.

OTHER REFERENCES

Baughman et al.: The Journal of Biological Chemistry, vol. 242, No. 22, Nov. 25, 1967, pp. 5252–5259.

LIONEL M. SHAPIRO, Primary Examiner

U.S. Cl. X.R.

195—66 B; 424—94, 98